United States Patent [19]
Høyer
[11] 4,119,755
[45] Oct. 10, 1978

[54] FIRE RETARDANT PLATE MATERIAL

[75] Inventor: Helge Høyer, Birkerød, Denmark
[73] Assignee: Rockwool International A/S, Hedehusene, Denmark

[21] Appl. No.: 712,611
[22] Filed: Aug. 9, 1976
[30] Foreign Application Priority Data
Dec. 8, 1975 [DK] Denmark ............................ 3643/75
[51] Int. Cl.[2] ............................................... B32B 19/00
[52] U.S. Cl. ...................................... 428/284; 52/404; 428/285; 428/920
[58] Field of Search ............... 428/280, 282, 284, 285, 428/286, 443, 444, 920, 921; 52/404; 110/1 A

[56] References Cited
U.S. PATENT DOCUMENTS
2,746,892 5/1956 Elfving ................................ 428/920
2,758,043 8/1956 Cryor .................................. 428/920
3,220,915 11/1965 Shannon ............................... 428/920
3,867,241 2/1975 Haglund ............................... 428/284
FOREIGN PATENT DOCUMENTS
1,132,089 10/1968 United Kingdom ..................... 428/920

*Primary Examiner*—James J. Bell
*Attorney, Agent, or Firm*—Lawrence Rosen; E. Janet Berry

[57] ABSTRACT
The invention relates to a fire retardant plate material to be incorporated in partitions and doors in housing, mainly comprising mineral wool with a binding agent bonding the fibres together at intersections and in which material the mineral wool is present in layers separated by intermediate thin layers of an inorganic matter acting as a cement between the layers.

1 Claim, 1 Drawing Figure

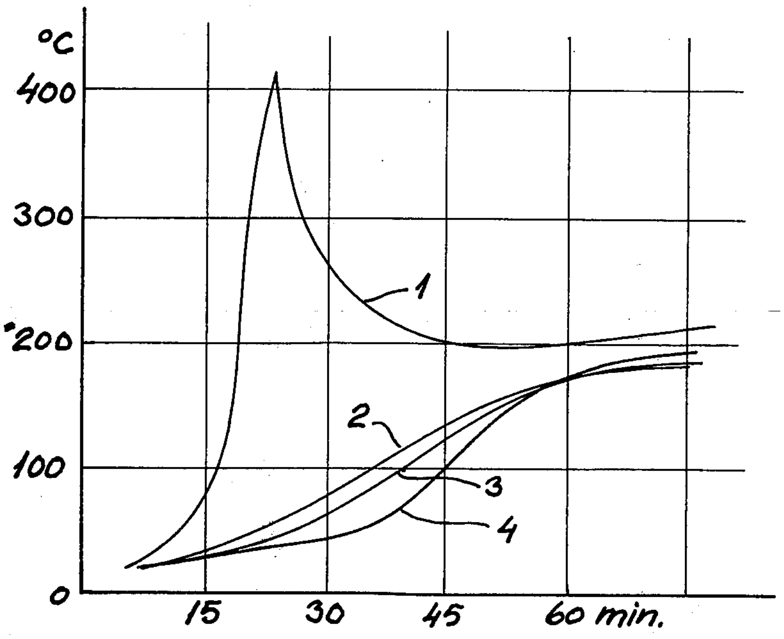
°C
400
300
200
100
0
15
30
45
60 min.
1
2
3
4

FIRE RETARDANT PLATE MATERIAL

The invention relates to a fire retardant plate material to be incorporated in walling, doors and other partition means in housing and ships etc. Specificly, it is incorporated in doors designed to retard the spreading of a fire from one room to adjoining rooms. The fireretardant plate material according to the invention is characterized in comprising at least two layers of mineral wool containing a binding agent, bonding together the fibres at intersections, the layers being separated by thinner layers of a substantially inorganic matter acting as a cement between the layers of mineral wool.

Door plate in houses normally comprises a wooden frame covered on each side with plywood sheets. A fire in one room will quickly ignite the plywood sheet facing the room. In the parts of the door inside the frame, the other panel will ignite shortly afterwards, giving the fire access to the adjoining room.

Door plate of this normal type is often used, owing to its favourable appearance and light weight, in other buildings such as office buildings, hotels and hospitals. In such buildings in which several rooms adjoin a common corridor or stairway, a type of panels having greater resistance to spreading of fire is required, and for this purpose a door plate having a frame with panels as described and further with a mat of light, substantially inorganic material between the panels is used.

Owing to difficulties in predicting the behaviour of building materials and parts during a fire based on experiences from actual fires, the behaviour and resistance of materials are judged by means of fire tests performed in a laboratory. In the tests an oven is used in which a fire is made by means of oil- or gasburners. The fuel injection is regulated in such a way that the temperature in the oven increases from the time of ignition, corresponding to a temperature/time curve defined in DS 1051. After 5, 15, 30, 45 and 60 minutes the temperature of the oven shall be 540°, 734°, 821°, 879° and 924° C. respectively. A fireretardant plate material is tested by exposing one side to the fire in the oven, the other side of the plate material facing the surroundings outside the oven. The plate material is brought into this position before the ignition of the burners. After the ignition the temperature of the surface facing the surroundings is measured and registered in dependence on time lapsed from ignition. The test continues until a maximum temperature on the outside face is reached.

As fireretardant plate material has been used mats of mineral wool containing a binding agent and in which the fibre material at increasing temperature changes from a glass-like amorphous state to a crystalline state before the substance is softened to such a degree that mats are deformed. In crystalline state the fibre substance is not softened at temperatures below 1000° C. The mechanical strength of the crystalline fibres decreases substantially, but the mats may be expected to provide the same level of protection to the panel not exposed to the fire as the wooden frame, at least if the specific weight of the mineral wool mat is in the area of 200–400 kg/m³. Mineral wool with binding agent is extensively used in building industry for heat- and sound-insulating products because of a favourable price. Mineral wool being able to resist high temperatures in the proper sense of the word is much more expensive.

In tests to prove the fireretarding proportion of mineral wool for the above purpose comprising a single layer, the temperature of the panel facing the surroundings will increase comparatively shortly after the ignition of the oven. The increase of temperature is followed by a decrease. These peculiar properties make the judgement of the fireretardant properties of the single layer mat difficult. In contrast, the plate material according to the present invention having the same specific weight and content of binding agent and thickness does not show such fast increases in temperature in said tests.

Plate material of mineral fibres having an inorganic coating on its outside face in order to improve its fire resistance has been proposed. For the inorganic coating compositions have been proposed of the same type as the thin layers according to the present invention. Such inorganic coatings, however, tend to be hard and brittle and may break off the surface during transport and installation. Flaking off even in small areas only makes the plate material questionable with respect to its fireretardant properties.

In the fireretardant material according to the present invention the thin layers of inorganic matter are protected against damage by being inside the plate material. By the invention a reliable product of the kind is provided, having a favourable price.

The invention is illustrated in the following by means of examples. Four samples of plate material have been subjected to a fire test as described above. The examples are:

I. Mineral wool mat in a single layer of mineral wool containing a binding agent. Thickness 28 mm, specific weight 300kg/m³, content of binding agent: 3% by weight.

II. Plate material according to the invention com- 5 layers of mineral wool of the same type and specific weight as in example I, and thin layers of inorganic cement C between the layers of mineral wool. Total thickness 28 mm.

III. Plate material according to the invention comprising 4 layers of mineral wool of the same type and specific weight as in example I and layers of inorganic cement C between the layers of mineral wool. Total thickness 34 mm.

IV. Plate material according to the invention comprising 5 layers of mineral wool of the same type, specific weight and content of binding agent as in example I, and layers of inorganic cement G with aluminum foil between the layers of mineral wool.

The inorganic cement C consisted of 150 g kaolin, 112 g water glass solution and 100 g water. Inorganic cement G was "Kollimal" from Henkel & Cie, Dusseldorf, which is a commercial adhesive for the fixation of ceramic tiles to walls and the like. Cements for the purpose may comprise small amounts of organic thickening or wetting agents. Thus, "kollimal" is composed of kaolin, a water glass solution, and an organic thickening agent. The binding agent in the mineral wool was phenol-melamine-formaldehyderesin.

In the figure a Diagram showing the temperature curves registered with respect to time from ignition of the even of the plate material facing the surroundings for plate material I, II, III, and IV are represented with the curves 1, 2, 3, and 4 respectively. Curve 1 shows a rise of temperature to 400° C. after 25 minutes which makes the estimate of the fire retardant properties of plate material I uncertain. The plate material according to the invention example II, III, and IV shows a rise of temperature of 40° to 60° C. which is considered a satisfactory low value.

It is remarkable that the curve 1 after the increase shows a decrease in temperature to 200° C. after 45 minutes. The only explanation possible is that an exothermic process has taken place in the material itself. The crystallisation of the fibre substance takes place with a release of heat energy, and it is believed that this is also due to the exothermic process in the present case. The crystallisation, however, takes place at a temperatature above 800° C. Therefore the crystallisation is believed to have taken place initially on a portion of the thickness at approximately the same time, and the released heat has passed through the thickness of the material as a heat front with gradually increasing spreading in the direction of the thickness and decreasing temperature.

The effect of the intermediate thin layers in the plate material according to the invention is supposed to be due to the fact that part of the heat energy released from the crystallisation is consumed in dehydration of the thin layers of cement and that these layers act as a heat screen reflecting the heat. Mineral wool with a specific weight of 300kg/m$^3$ has a porousity of 90%, and the solid matter is only 10% of the total volume of the mineral wool. Therefore, heat may radiate for some distance into the material. This explains why the plate according to example IV shows the best results in spite of it being the thinnest of the four samples in the testing.

We claim:

1. Fire retardant plate material to incorporate in walling, doors and partition means in housing, ships and the like, comprising a mineral wool, having the fibres thereof bonded together at intersections by a binding agent, said fibres being transformable from a glasslike amorphous state into crystalline state prior to softening visibly when exposed to increasing temperature characterized in comprising at least two layers of mineral wool being separated by thin layers of a substantially inorganic cement between the layers of mineral wool.

* * * * *